US006587031B1

(12) United States Patent
Daugherty et al.

(10) Patent No.: US 6,587,031 B1
(45) Date of Patent: Jul. 1, 2003

(54) SECURE STORAGE OF HIGH VALUE ITEMS

(75) Inventors: Jack R. Daugherty, Fort Worth, TX (US); Jodie W. Mooty, Euless, TX (US); James C. Gaughan, Colleyville, TX (US)

(73) Assignee: Cash America International, Inc., Fort Worth, TX (US)

( * ) Notice: Subject to any disclaimer, the term of this patent is extended or adjusted under 35 U.S.C. 154(b) by 791 days.

(21) Appl. No.: 08/874,626

(22) Filed: Jun. 13, 1997

(51) Int. Cl.[7] .............................................. G05B 19/00

(52) U.S. Cl. ........................ 340/5.31; 340/5.5; 340/5.2; 340/5.51; 340/825.49; 235/382; 700/243; 221/92

(58) Field of Search ........................ 340/825.31, 825.49; 235/385; 364/479.13

(56) References Cited

U.S. PATENT DOCUMENTS 4,636,634 A * 1/1987 Harper et al. ............... 235/385
5,212,649 A * 5/1993 Pelletier et al. ........ 364/479.13
5,389,919 A * 2/1995 Warren et al. ......... 340/825.31

FOREIGN PATENT DOCUMENTS

| | | |
|---|---|---|
| EP | 140839 | 5/1985 |
| EP | 703341 | 3/1996 |
| FR | 2245546 | 4/1975 |
| FR | 2630492 | 10/1989 |

OTHER PUBLICATIONS

Rowe 650 Showcase Merchandiser Field Service Manual and Parts Catalog, Part No. 90065001, First Edition, Aug. 1996.

* cited by examiner

*Primary Examiner*—Michael Horabik
*Assistant Examiner*—Yves Dalencourt
(74) *Attorney, Agent, or Firm*—Fish & Richardson P.C.

(57) ABSTRACT

Items are securely stored and retrieved using a storage unit having separate compartments. A storage code is provided to the storage unit, and the storage unit responds by permitting access to a particular compartment while preventing access to other compartments. An item then is placed in the particular compartment. At a later time, a retrieval code is provided to the storage unit and the storage unit responds by permitting access to the particular compartment while preventing access to other compartments. The item then may be retrieved from the particular compartment.

25 Claims, 10 Drawing Sheets

SECURE STORAGE OF HIGH VALUE ITEMS

BACKGROUND

The invention relates to secure storage of high value items.

There are many situations in which large numbers of high value items must be securely stored. For example, pawn shops often need to store jewelry or other high value items. In a typical pawn shop transaction, a customer obtains a loan from the pawn shop based on the commercial value of an item that the customer leaves with the pawn shop as collateral. Often, the commercial value of an item may be significantly less than the value that the customer associates with the item. For example, a piece of jewelry or a watch that has been passed down through several generations of a family may have substantially more sentimental or emotional value than the actual commercial value of the item.

In general, when a pawn shop customer leaves a piece of jewelry or some other high value item as collateral, a pawn shop employee records the customer's name or other identifying information on an envelope and places the item in the envelope. The employee then places the envelope in a safe located on the premises of the pawn shop. When the customer repays the pawn loan, the item is retrieved from the safe and returned to the customer. If the customer fails to repay the pawn loan, the item becomes the property of the pawn shop and is retrieved from the safe and offered for sale by the pawn shop. Typically, small-volume, high-value items, such as rings and other jewelry, that are being offered for sale are displayed in a display case.

For many years, pawn shops have been victimized by so-called "smash-and-grab" robberies in which a group of thieves enters the premises of the pawn shop, smashes the display case, and grabs whatever jewelry or other items that are within reach. Typically, these robberies are over within only a few minutes, and before police are able to respond to alarms or calls for assistance.

More recently, smash-and-grab thieves have learned of the safes in which pawn shops keep the jewelry and other items that have been left as loan collateral. The thieves have used threats of physical violence or other means to force pawn shop employees to give the thieves access to the safes. This has resulted in a tremendous increase in the losses associated with smash-and-grab robberies. In addition, because a customer may consider an item to be irreplaceable, it may be difficult or impossible to compensate the customer for loss of the item.

SUMMARY

The invention provides secure storage of items such as jewelry. In one aspect, generally, the invention features securely storing and retrieving items using a storage unit, such as a modified vending machine, having separate compartments. A storage code is provided to the storage unit, and the storage unit responds by permitting access to a particular compartment while preventing access to other compartments so that an item may be placed in the particular compartment. At a later time, a retrieval code is provided to the storage unit, and the storage unit responds by permitting access to the particular compartment while preventing access to other compartments so that the item may be retrieved from the particular compartment. By limiting access to only one compartment at a time, the invention limits the ability of thieves to steal a large quantity of jewelry or other high value items in a short period of time.

Embodiments of the invention may include one or more of the following features. The storage code may be a compartment identifier and the storage unit may be configured to permit access to a compartment associated with the compartment identifier. The storage code also may include an access code and the storage unit may be configured to prevent access to all compartments when an incorrect access code is provided. The storage code and the retrieval code may be a common compartment code, such as a compartment or item identifier. In general, a compartment, contents of the compartment, and identifying characteristics of the compartment, such as a compartment code, are not visible from an exterior of the storage unit when access to the compartment is not permitted.

The storage code may be a transaction identifier, and the storage unit may be configured to select an available compartment to which access is to be permitted. When each compartment is configured to store multiple items in, for example, a bin, the storage unit may be configured to select a compartment storing a smaller number of items than other compartments. Similarly, the storage unit may be configured to select a compartment storing a smaller value of items than other compartments.

The storage unit may include a security screen, such as a sheet of steel, covering the front of the storage unit and positioned to conceal the storage compartments and their contents. The security screen will limit access to the storage compartments and thereby increase the difficulty of stealing items contained within the storage compartment.

The storage unit also may be configured to insert delays between access to different compartments. For example, the storage unit may be configured to use delays to permit access to only one compartment each minute, only two compartments each five minutes, and only three compartments each fifteen minutes. The storage unit may insert delays by initiating a timer after permitting access to a storage compartment, and waiting for the timer to expire before permitting access to an additional storage compartment. The use of delays will further limit the ability of thieves to quickly steal large numbers of items.

The storage unit may be located in a lockable safe that may be closed to provide further security. The storage unit also may be secured to an interior surface of the safe. For example, the safe may include an extension, such as a bolt, that extends from the interior surface of the safe and through an exterior surface of the storage unit to secure the storage unit within the safe.

Other features and advantages of the invention will be apparent from the following description, including the drawings, and from the claims.

DETAILED DESCRIPTION

Figure 1:
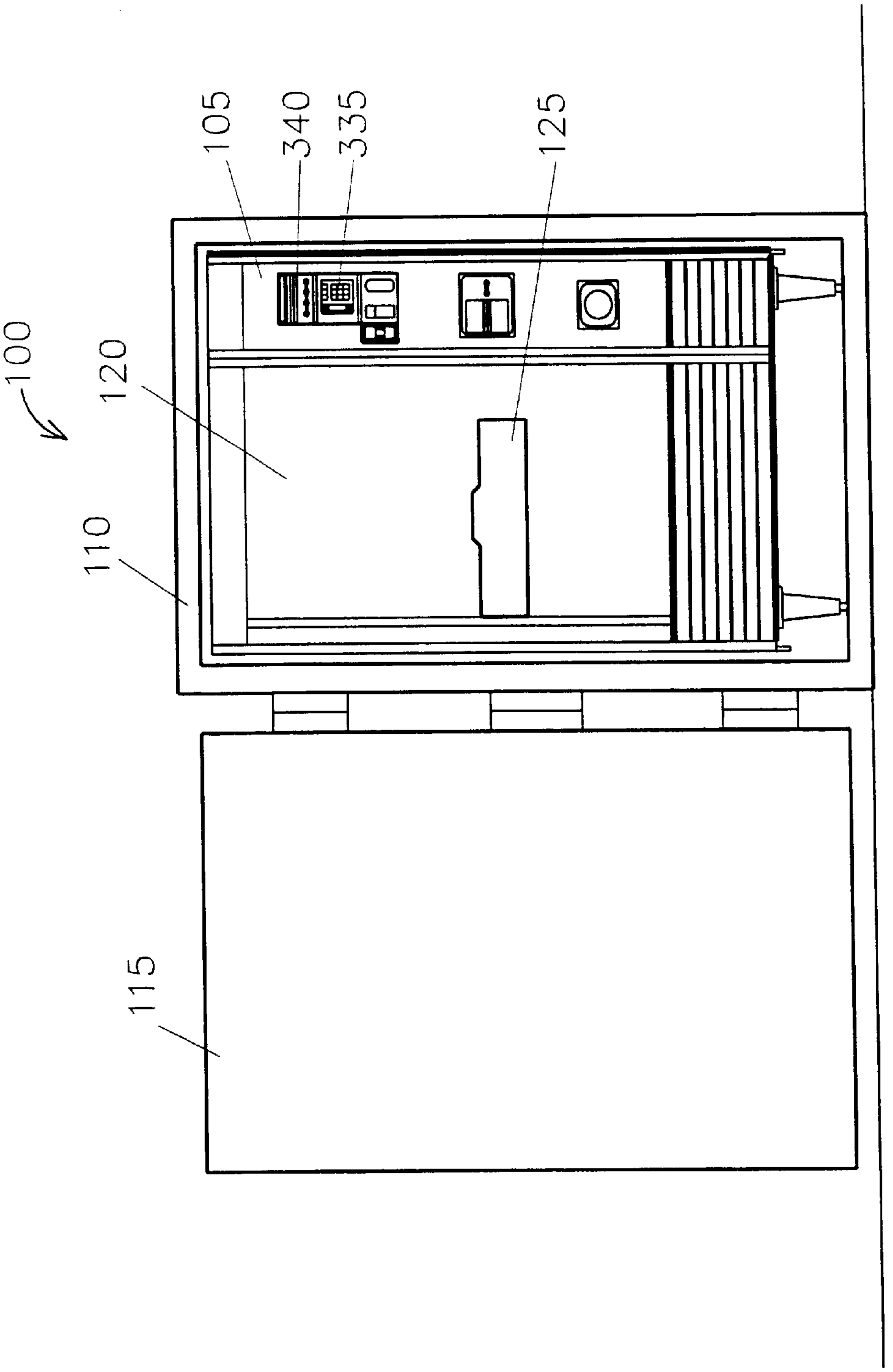
FIG. 1 is a front view of a storage system.
Figure 2:
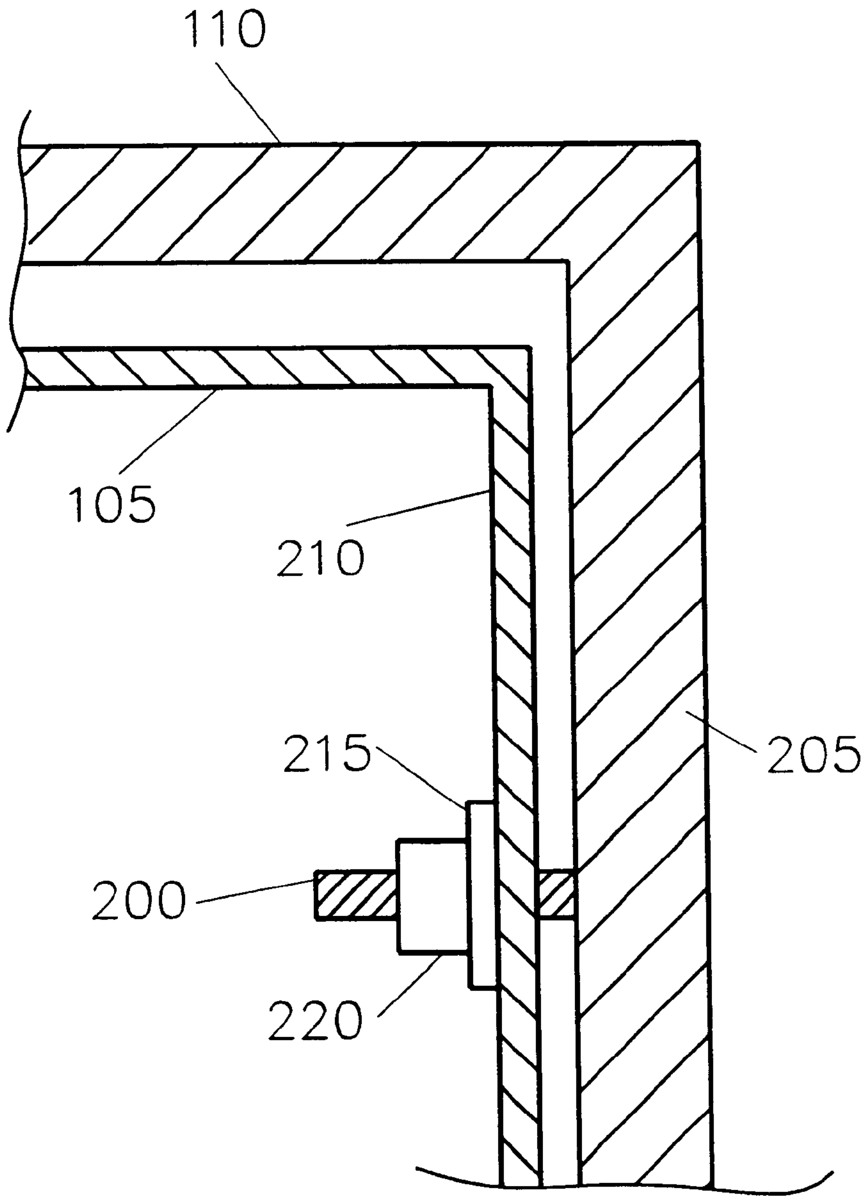
FIG. 2 is a partial, cut-away side view of the system of FIG. 1.

Referring to FIG. 1, a storage system 100 may be implemented using a storage unit 105 and a safe 110 in which the storage unit 105 is secured. For example, as shown in FIG. 2, the storage unit 105 may be secured to the safe 110 by a threaded bolt 200 extending from a rear wall 205 of the safe 110 and through a rear panel 210 of the storage unit 105. The storage unit 105 is secured by a washer 215 and a nut 220 positioned inside the storage unit 105. In general, the storage unit 105 provides security sufficient to prevent, or at least delay, theft of valuables stored within the storage unit 105. The safe 110 is provided to prevent after-hours attempt to break into the storage unit 105. As such, the door 115 of the safe 110 may be open during business hours and closed after business hours.

Figure 3:
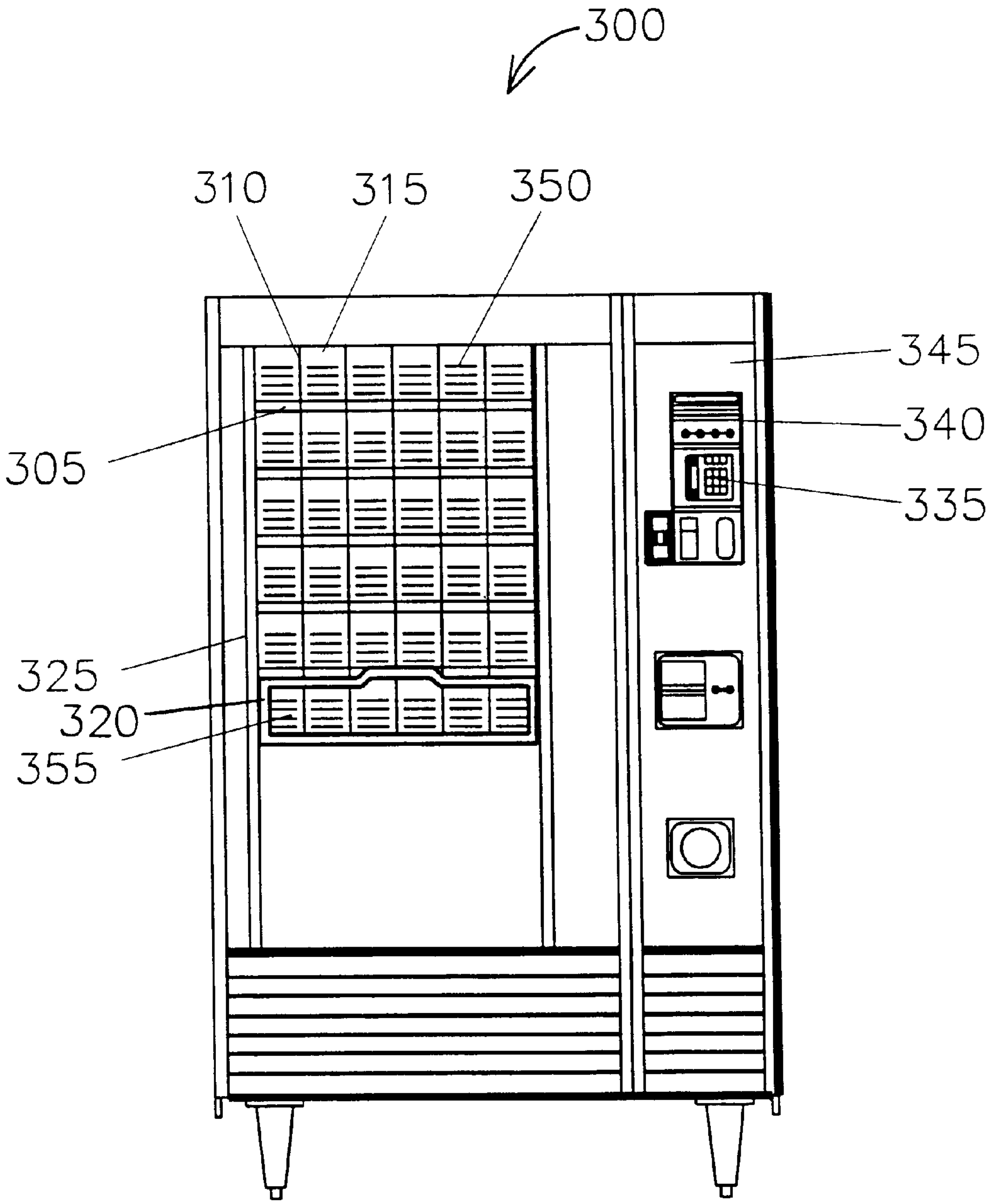
FIG. 3 is a front view of a vending machine.

Referring to FIG. 3, the storage unit 105 may be implemented using a modified vending machine 300, such as a modified version of the Rowe 651 Showcase Merchandiser available from Rowe International, Inc. of Grand Rapids, Michigan.

Figure 3A:
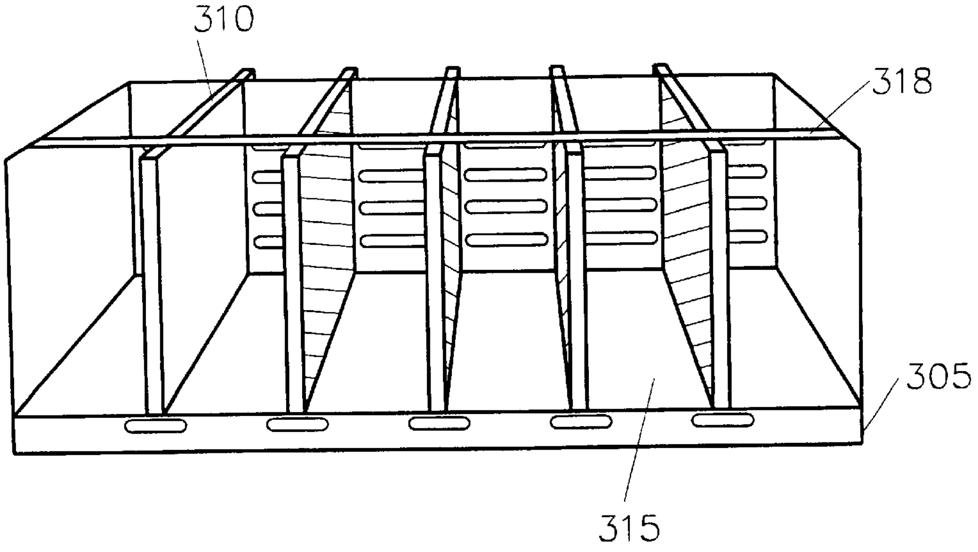
FIG. 3A is a perspective view of a shelf of the vending machine of FIG. 3.

Referring also to FIG. 3A, the vending machine 300 may include sixteen twenty-four-inch horizontal shelves 305 for storage of merchandise. The shelves 305 rotate vertically inside the machine 300. From one to five dividers 310 may be placed on each shelf 305 so that each shelf may define six different storage compartments 315. A divider lockbar 318 spans the top of the shelf to hold the dividers firmly in position and prevent unauthorized access to adjacent compartments. A removable bin for storing merchandise may be positioned in each compartment 315.

Figure 4A:
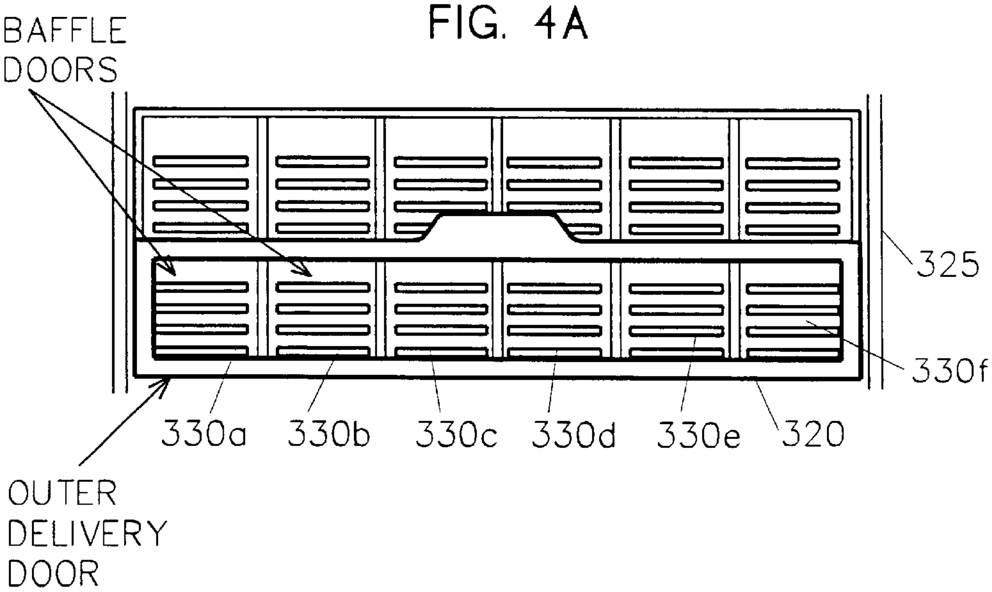
FIGS. 4A and 4B are front views of shelves and doors of the vending machine of FIG. 3.
Figure 4B:
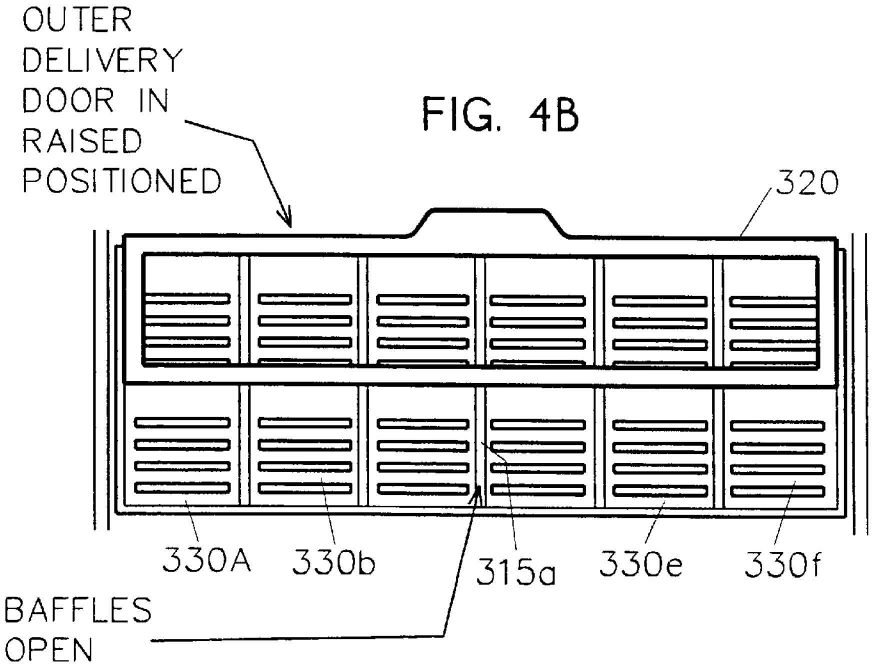

As shown in FIGS. 4A and 4B, the vending machine 300 includes a dual door system. An outer door 320 spans the width of an access section 325. Six inner doors 330, also called baffles, access the six four-inch shelf sections corresponding to the six compartments of the shelf. When a compartment is selected for access, the baffle 330 corresponding to the selected compartment is opened. All of the other baffles remain closed and locked. When a compartment has been expanded to include more than one four-inch shelf section, all of the baffles for that compartment will open. For example, as shown in FIG. 4B, the baffles 330*c* and 330*d* corresponding to an expanded central compartment 315*a* are opened.

When an appropriate code is entered using a keypad 335 located on a display panel 340, the shelf 305 that includes the compartment 315 corresponding to the code is moved to the access section 325 and the baffle 330 for the compartment is opened. The outer door 320 then may be opened (FIG. 4*b*) to remove the bin of merchandise stored in the compartment.

Figure 5:
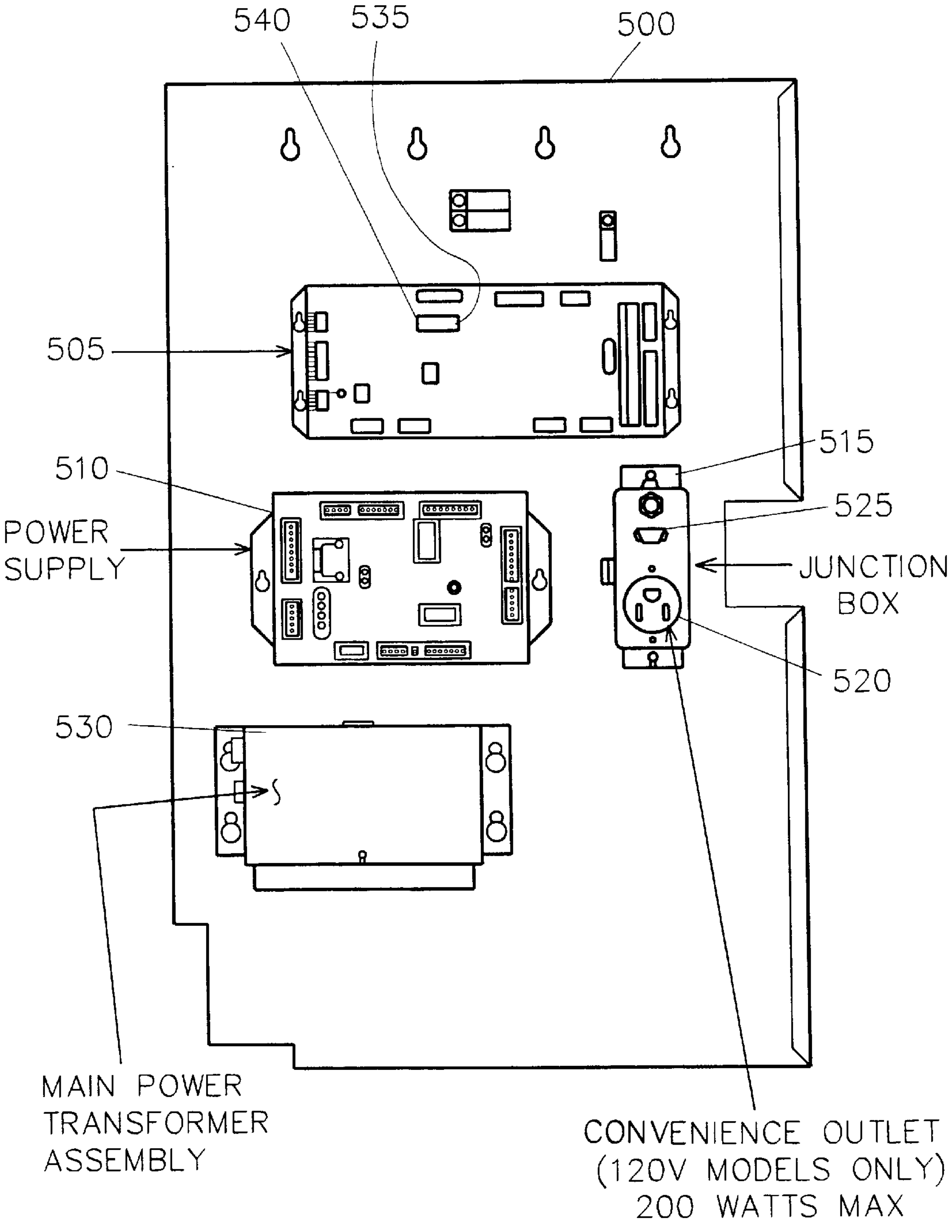
FIG. 5 is a front view of a service panel of the vending machine of FIG. 3.

The machine 300 includes a service door 345 that may be opened to provide access to a slide-out service panel 500 (FIG. 5), main door latches, and a conveyor motor assembly. Referring also to FIG. 5, the slide-out service panel 500 includes a control board 505, a power supply 510, and a junction box 515. The control board 505 controls all components of the machine 300 and collects and stores information, such as error messages and audit data. The junction box 515 includes a 120 volt outlet 520 and a printer port 525. The main power transformer assembly 530 is also located on the slide-out panel. The slide-out panel allows access to control systems of the machine 300 without opening the main door.

The control board 505 operates under control of software stored on an electrically-programmable read-only-memory ("EPROM") 535. The EPROM 535 is removable and may be updated as new software revisions become available. A label on the top of the EPROM, visible through the square hole 540 above the word "CHIP" on the control board 505, indicates the revision level of the software stored on the EPROM.

The shelves are mounted on individual carrier assemblies that travel on a fixed guide track. The carriers are connected to drive chains, which are turned by drive sprockets. The drive sprockets are powered by a twenty-four-volt motor located in the service compartment. The carrier assemblies on the left side of the cabinet use alignment gears to keep the shelves horizontal.

Referring again to FIG. 1, the storage unit 105 differs from the vending machine 300 in a number of ways. First, the front of the storage unit 105 is covered by a piece of security steel 120 in the place in which the vending machine 300 includes a plexiglass or otherwise transparent display window 350. The security steel hides the contents of the storage unit and prevents access to the interior of the storage unit. In addition, in the storage unit 105, the dividers and the baffles are made from metal or modified to give the appearance of being made from metal. For example, the baffles may be made from dark smoke plastic. Similarly, while the outer door 325 of the vending machine 300 includes a transparent plexiglass panel 355, the outer door 125 of the storage unit 105 is made from aluminum or a similar material. These modifications serve the dual purposes of inhibiting the view of the items stored in the storage unit 105 and reducing the opportunity for a "smash and grab" robbery.

The safe 110 may be implemented using a Granite 1000 Security Safe available from Granite Security Products, Inc. of Fort Worth, Tex. The safe may be approximately 47 inches wide, 35 inches deep, and 75 inches high. The safe may have a fire rating of thirty minutes, a single handle, and a six digit electronic digital lock.

Figure 6:
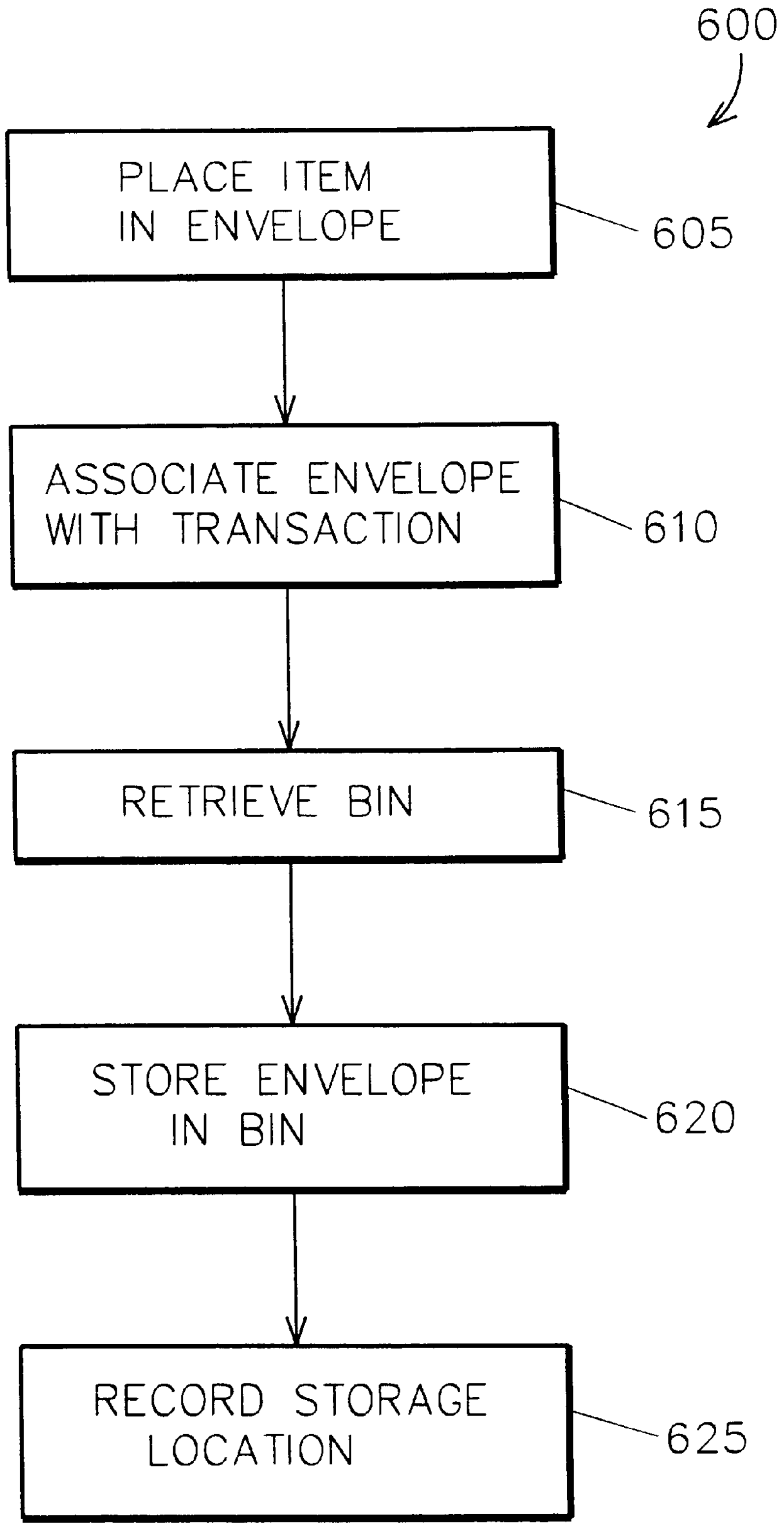
FIGS. 6 and 8 are flow charts of procedures implemented using the system of FIG. 1.
Figure 7:
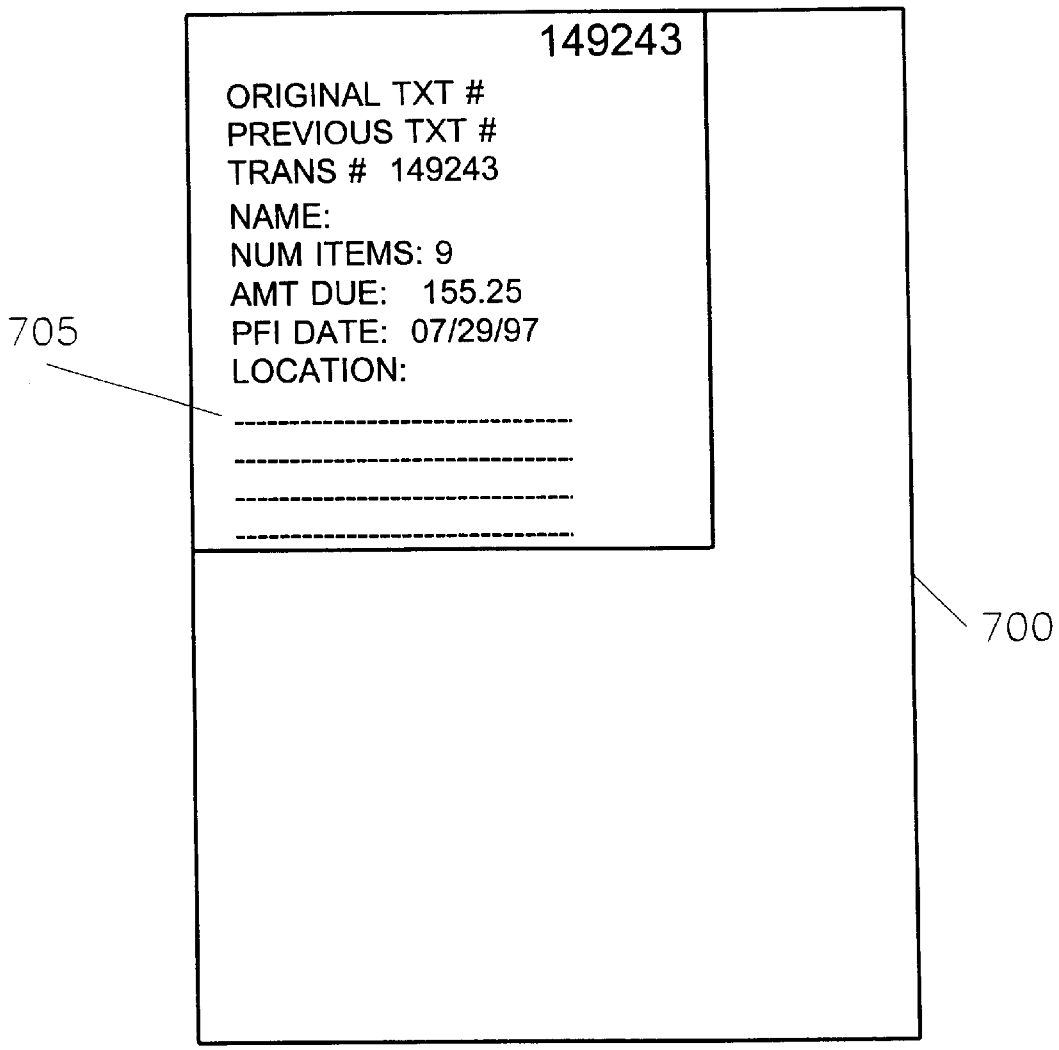
FIG. 7 is a front view of an envelope used for storing items in the system of FIG. 1.

Items may be stored in the storage unit 105 according to the procedure 600 illustrated in FIG. 6. After a transaction has been completed, an item is placed in an envelope (step 605). As shown in FIG. 7, the envelope may be a three inch by five inch envelope 700 having a transparent display window. Next, the envelope is associated with the transaction (step 610) by, for example, attaching to the envelope a ticket stub 705 that identifies the transaction. Alternatively, the envelope could be associated with the transaction by entering a number or other identifier printed on the envelope into a record for the transaction (e.g., a computer database entry or a logbook entry). Similarly, a number or other identifier associated with the transaction could be recorded on the envelope.

Next, a bin of the storage unit 105 is retrieved (step 615). The storage unit 105 may be implemented to retrieve a bin in a number of ways. For example, in one implementation, the manager of the pawn shop may enter an access code followed by a number (e.g., 87) associated with a bin (e.g., bin 87) in which the manager wants to place the envelope, and the storage unit 105 may respond by moving the selected bin to the access position. In other implementations, the manager may enter an access code and a transaction identifier, or just an access code, and the storage unit 105 may select a bin, either randomly or based on the number of envelopes or the value of items stored already in each bin.

Next, the manager stores the envelope in the bin (step 620) and records the storage location in the record for the transaction (step 625). In the implementation in which the manager selects and enters the bin number, the manager would simply record the selected bin number. In the implementation in which the storage unit 105 selects a bin in response to an access code, the storage unit 105 would display a number or other identifier for the bin to the manager so that the manager could record the bin number in the transaction record. In the implementation in which the storage unit 105 selects a bin in response to an access code and a transaction identifier, the storage unit 105 may automatically store the bin number associated with the transaction so that the manager does not need to separately record the bin number. However, as a backup measure, the storage unit 105 may display the bin number to permit recordation by the manager.

Figure 8:
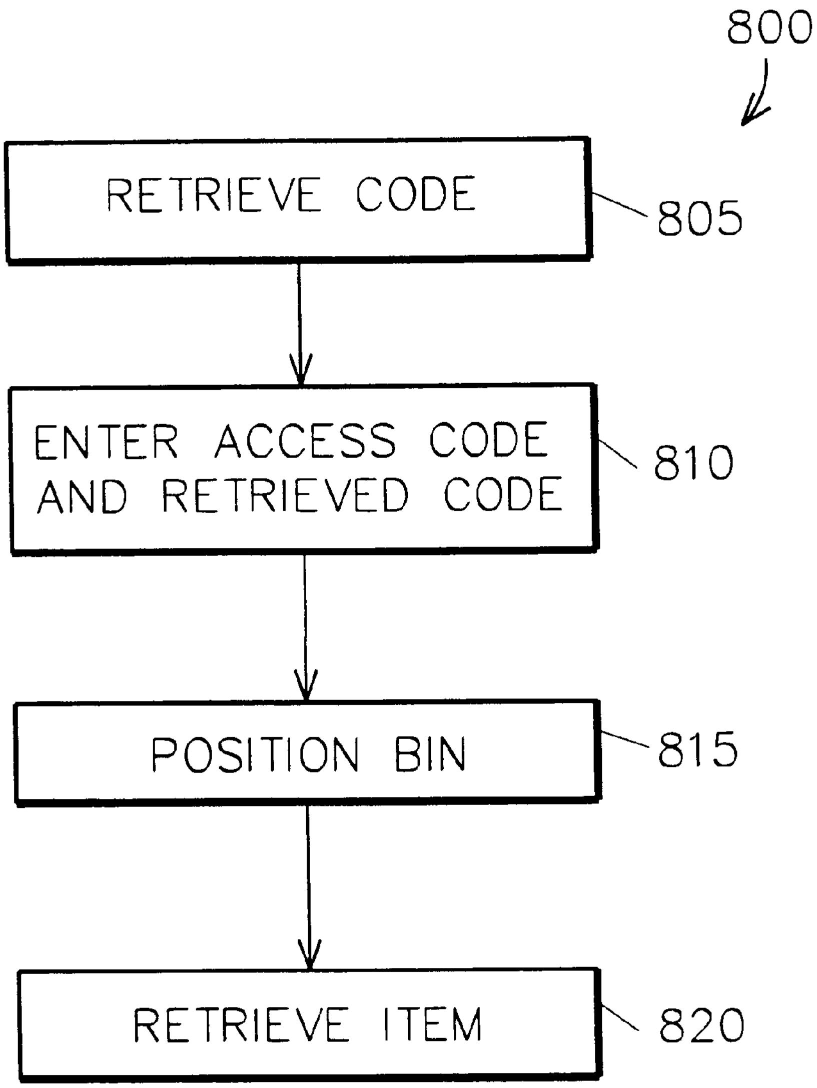
Figure 9:
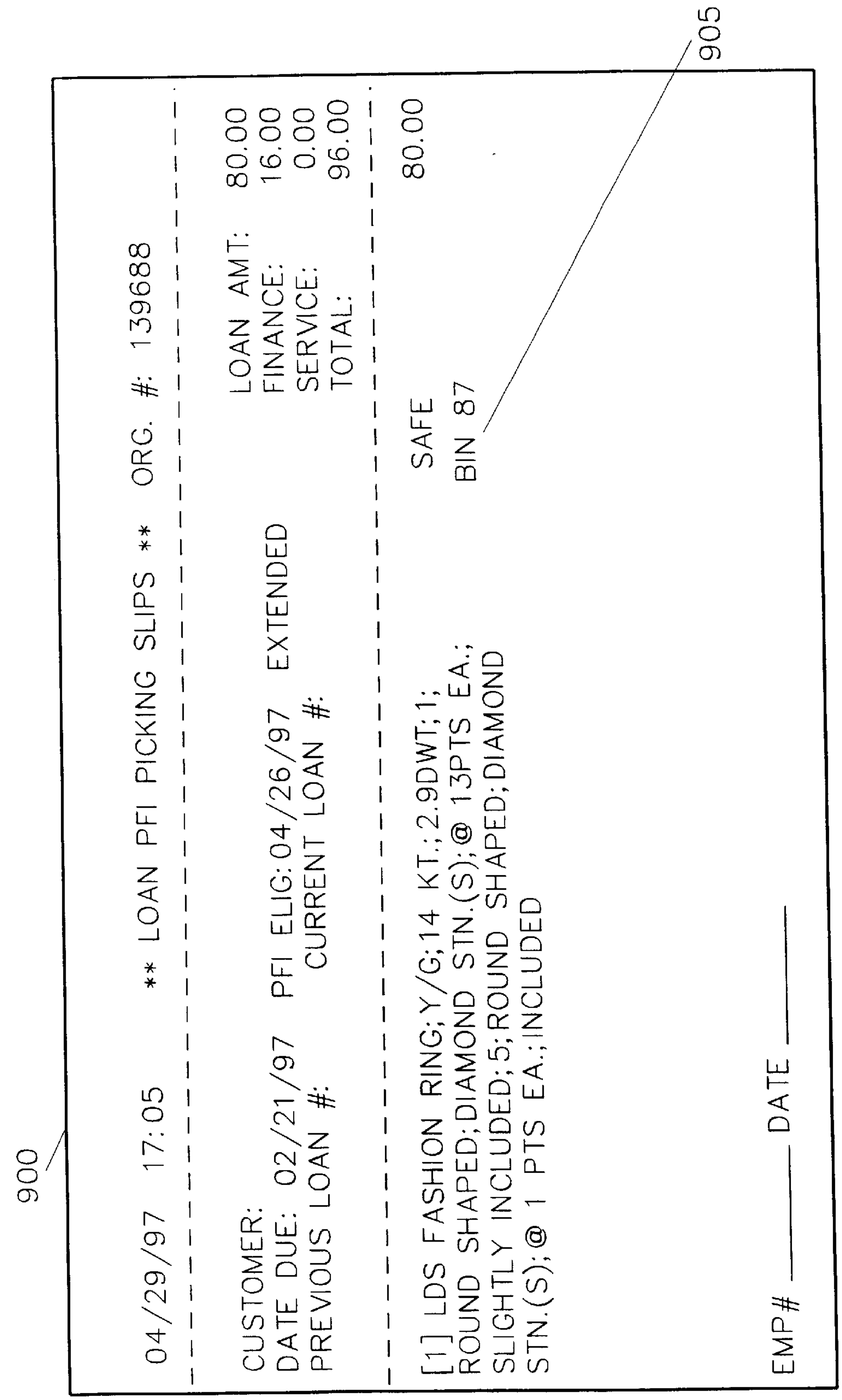
FIG. 9 is a front view of an item ticket used with the system of FIG. 1.

An item may be retrieved in the storage unit 105 according to the procedure 800 illustrated in FIG. 8. Once a customer pays back a loan, the manager retrieves the bin number or other code needed to identify the bin in which the item is stored (step 805). For example, in one implementation, as shown in FIG. 9, the manager may print out a ticket 900 that identifies the bin location 905 for a transaction. In other implementations, the manager may retrieve the bin number from a logbook, or may print out or retrieve the transaction number.

The manager then enters the manager's access code and the bin number or other identifying code (e.g., the transaction code) into the storage unit 105 (step 810) and the storage unit 105 moves the appropriate bin to the access position (step 815). Finally, the manager retrieves the customer's item from the bin and returns the item to the customer to complete the transaction (step 820).

For security purposes, the storage unit 105 may maintain a record of codes used to access the bins of the storage unit 105 and the times at which the codes were used. To deter thieves from forcing an employee to open the storage unit 105, no key to the storage unit will be kept on the premises of the pawn shop or other establishment in which the storage unit 105 is located. Such forced access may be further prevented by configuring the storage unit 105 to limit the frequency with which compartments may be accessed. For example, the storage unit 105 may be configured to permit access to only one compartment each minute, only two compartments each five minutes, and only three compartments each fifteen minutes.

Other embodiments are within the scope of the following claims. For example, storage units having other bin arrangements could be employed.

Also, a storage unit could be connected to an external computer or computer network to permit additional functions such as automatic bin selection and recordation, statistics generation, and inventory balancing and monitoring. For example, the computer could be configured to permit bins to be selected in a way that distributes items or item values through the available bins to minimize the loss associated with unauthorized access to a particular bin. In one such implementation, the system could be configured to select the bin having the lowest aggregate value of stored items when a new item is to be stored in the storage unit. Similarly, different security levels could be associated with different bins, so that a code used to access bins storing relatively low value items would differ from a code used to access bins storing relatively high value items are stored. Such differing security levels could be used to permit more junior employees to access "low value" bins while only permitting a manager or other high level employee to access "high value" bins. Such functionality could be provided without requiring a direct connection between the storage unit and the computer system.

The system could be employed in places other than pawn shops. For example, it could be used in jewelry stores or to provide safe deposit boxes in hotels, fitness centers, country clubs and other locations. When providing a safe deposit box function, the storage unit could be located in a publicly-accessible location, and each bin could be dedicated to a single user. In such an implementation, the user enters a code known only to the user into the storage unit, and the storage unit responds by opening an empty bin. The user then places items of value into the bin and closes the bin. To retrieve the items, the user enters the code into the storage unit and the storage unit responds by opening the user's bin. The storage unit may be modified to require a user to insert a room key or membership pass before the storage unit will permit the user to enter a code. Similarly, the storage unit could be modified to require the user to pay a usage fee before permitting the user to enter a code.

What is claimed is:

1. A method of securely storing and retrieving items, the method comprising:

providing a storage unit having separate compartments and an access section;

providing a storage code to the storage unit, the storage unit responding by moving a particular compartment to the access section and permitting access to the particular compartment while continually preventing access to all other compartments;

placing an item into the particular compartment;

at a later time, providing a retrieval code to the storage unit, the storage unit responding by moving the particular compartment to the access section and permitting access to the particular compartment while continually preventing access to all other compartments; and retrieving the item from the particular compartment;

wherein the storage code comprises a transaction identifier, and the storage unit is configured to select an available compartment to which access is to be permitted;

wherein each compartment is configured to store multiple items, and wherein the storage unit is configured to select a compartment storing a smaller number of items than other compartments.

2. A method of securely storing and retrieving items, the method comprising:

providing a storage unit having separate compartments and an access section;

providing a storage code to the storage unit, the storage unit responding by moving a particular compartment to the access section and permitting access to the particular compartment while continually preventing access to all other compartments;

placing an item into the particular compartment;

at a later time, providing a retrieval code to the storage unit, the storage unit responding by moving the particular compartment to the access section and permitting access to the particular compartment while continually preventing access to all other compartments; and retrieving the item from the particular compartment;

wherein the storage code comprises a transaction identifier, and the storage unit is configured to select an available compartment to which access is to be permitted;

wherein each compartment is configured to store multiple items, and wherein the storage unit is configured to select a compartment storing a smaller value of items than other compartments.

3. A method of securely storing and retrieving items, the method comprising:

providing a storage unit having separate compartments and an access section;

providing a storage code to the storage unit, the storage unit responding by moving a particular compartment to the access section and permitting access to the particular compartment while continually preventing access to all other compartments;

placing an item into the particular compartment;

at a later time, providing a retrieval code to the storage unit, the storage unit responding by moving the particular compartment to the access section and permitting access to the particular compartment while continually preventing access to all other compartments;

retrieving the item from the particular compartment; and securing the storage unit to an interior surface of a lockable safe.

4. A method of securely storing and retrieving items, the method comprising:

providing a storage unit having separate compartments and an access section;

providing a storage code to the storage unit, the storage unit responding by moving a particular compartment to the access section and permitting access to the particular compartment while continually preventing access to all other compartments;

placing an item into the particular compartment;

at a later time, providing a retrieval code to the storage unit, the storage unit responding by moving the particular compartment to the access section and permitting access to the particular compartment while continually preventing access to all other compartments;

retrieving the item from the particular compartment; and retrieving a second item from an additional compartment, wherein the second item is retrieved only after expiration of a predetermined time period after retrieval of the first item.

5. A storage unit for securely storing and retrieving items, the storage unit comprising:

separate storage compartments, each storage compartment being configured to receive an item;

an access section for providing access to a storage compartment;

a controller configured to:

respond to a storage code by moving a particular storage compartment to the access section and permitting access to the particular compartment while continually preventing access to all other compartments, and respond to a retrieval code by moving a particular storage compartment to the access section and permitting access to the particular compartment while continually preventing access to all other compartments; and a security screen covering a front of the storage unit and positioned to conceal from an exterior of the storage unit compartments and contents of compartments to which access is not permitted;

wherein the storage code comprises a transaction identifier, and wherein the controller is configured to select an available compartment to which access is to be permitted;

wherein each compartment is configured to store multiple items, and wherein the controller is configured to select a compartment storing a smaller number of items than other compartments.

6. A storage unit for securely storing and retrieving items, the storage unit comprising:

separate storage compartments, each storage compartment being configured to receive an item;

an access section for providing access to a storage compartment;

a controller configured to:

respond to a storage code by moving a particular storage compartment to the access section and permitting access to the particular compartment while continually preventing access to all other compartments, and respond to a retrieval code by moving a particular storage compartment to the access section and permitting access to the particular compartment while continually preventing access to all other compartments; and a security screen covering a front of the storage unit and positioned to conceal from an exterior of the storage unit compartments and contents of compartments to which access is not permitted;

wherein the storage code comprises a transaction identifier, and wherein the controller is configured to select an available compartment to which access is to be permitted;

wherein each compartment is configured to store multiple items, and wherein the controller is configured to select a compartment storing a smaller value of items than other compartments.

7. A storage unit for securely storing and retrieving items, the storage unit comprising:

separate storage compartments, each storage compartment being configured to receive an item;

an access section for providing access to a storage compartment;

a controller configured to:

respond to a storage code by moving a particular storage compartment to the access section and permitting access to the particular compartment while continually preventing access to all other compartments, and respond to a retrieval code by moving a particular storage compartment to the access section and permitting access to the particular compartment while continually preventing access to all other compartments;

a security screen covering a front of the storage unit and positioned to conceal from an exterior of the storage unit compartments and contents of compartments to which access is not permitted;

a housing containing the storage compartments and controller, defining the access section, and carrying the security screen; and a lockable safe in which the housing is positioned.

8. The storage unit of claim 7, wherein the housing is secured to an interior surface of the safe.

9. The storage unit of claim 8, wherein the safe comprises an extension that extends from an interior surface of the safe and through an exterior surface of the housing to secure the housing within the safe.

10. A storage unit for securely storing and retrieving items, the storage unit comprising:

separate storage compartments, each storage compartment being configured to receive an item;

an access section for providing access to a storage compartment;

a controller configured to:

respond to a storage code by moving a particular storage compartment to the access section and permitting access to the particular compartment while continually preventing access to all other compartments, and respond to a retrieval code by moving a particular storage compartment to the access section and permitting access to the particular compartment while continually preventing access to all other compartments; and a security screen covering a front of the storage unit and positioned to conceal from an exterior of the storage unit compartments and contents of compartments to which access is not permitted;

wherein the controller is configured to initiate a timer after permitting access to a storage compartment, and to wait for the timer to expire before permitting access to an additional storage compartment.

11. The method of claim 4, wherein the storage code comprises a compartment identifier and the storage unit is configured to move a compartment associated with the compartment identifier to the access section and permit access to the compartment.

12. The method of claim 11, wherein the storage code further comprises an access code and the storage unit is configured to prevent access to all compartments when an incorrect access code is provided.

13. The method of claim 4, wherein the storage code and the retrieval code comprise a common compartment code.

14. The method of claim 13, wherein the common compartment code comprises an item identifier.

15. The method of claim 4, wherein a compartment, contents of the compartment, and identifying characteristics of the compartment are not visible from an exterior of the storage unit when access to the compartment is not permitted.

16. The method of claim 4, wherein the storage code comprises an access code and the storage unit is configured to prevent access to all compartments when an incorrect access code is provided.

17. The method of claim 4, wherein the storage code comprises a transaction identifier, and wherein the storage unit is configured to select an available compartment to which access is to be permitted.

18. The storage unit of claim 10, wherein the storage code comprises a compartment identifier and the controller is configured to move a compartment associated with the compartment identifier to the access section and permit access to the compartment.

19. The storage unit of claim 18, wherein the storage code further comprises an access code and the storage unit is configured to prevent access to all compartments when an incorrect access code is provided.

20. The storage unit of claim 18, wherein no compartment identifier is visible on the storage unit from an exterior of the storage unit.

21. The storage unit of claim 10, wherein the storage code and the retrieval code comprise a common compartment code.

22. The storage unit of claim 21, wherein the common compartment code comprises a compartment identifier.

23. The storage unit of claim 21, wherein the common compartment code comprises an item identifier.

24. The storage unit of claim 10, wherein the storage code comprises an access code and the controller is configured to prevent access to all compartments when an incorrect access code is provided.

25. The storage unit of claim 10, wherein the storage code comprises a transaction identifier, and wherein the controller is configured to select an available compartment to which access is to be permitted.

* * * * *